United States Patent
Mallick, Jr. et al.

[15] 3,686,564
[45] Aug. 22, 1972

[54] MULTIPLE FREQUENCY MAGNETIC FIELD TECHNIQUE FOR DIFFERENTIATING BETWEEN CLASSES OF METAL OBJECTS

[72] Inventors: George T. Mallick, Jr.; Walter J. Carr, Jr.; Robert C. Miller, all of Pittsburgh, Pa.

[73] Assignee: Westinghouse Electric Corporation, Pittsburgh, Pa.

[22] Filed: Oct. 8, 1970

[21] Appl. No.: 79,180

[52] U.S. Cl.................................324/41, 340/258 C
[51] Int. Cl. .............................................G01r 33/00
[58] Field of Search .........324/41, 40, 3; 340/258 R, 258 C

[56] References Cited

UNITED STATES PATENTS

| | | |
|---|---|---|
| 2,929,984 | 3/1960 | Puranen et al.................. 324/3 |
| 3,012,190 | 12/1961 | Doll..............................324/41 |
| 3,500,373 | 3/1970 | Minasy...................340/258 R |

FOREIGN PATENTS OR APPLICATIONS

| | | |
|---|---|---|
| 798,999 | 11/1968 | Canada........................324/41 |

Primary Examiner—Robert J. Corcoran
Attorney—F. H. Henson, C. F. Renz and M. P. Lynch

[57] ABSTRACT

The invention relates to an A.C. metal detection apparatus employing a means for subjecting metal objects to oscillating magnetic fields of more than one frequency, and measuring circuits for detecting at each frequency the magnetic field due to the presence of the object and analyzing the magnetic fields to classify the objects on the basis of parameters such as size, shape, thickness, and surface to volume ratio.

18 Claims, 9 Drawing Figures

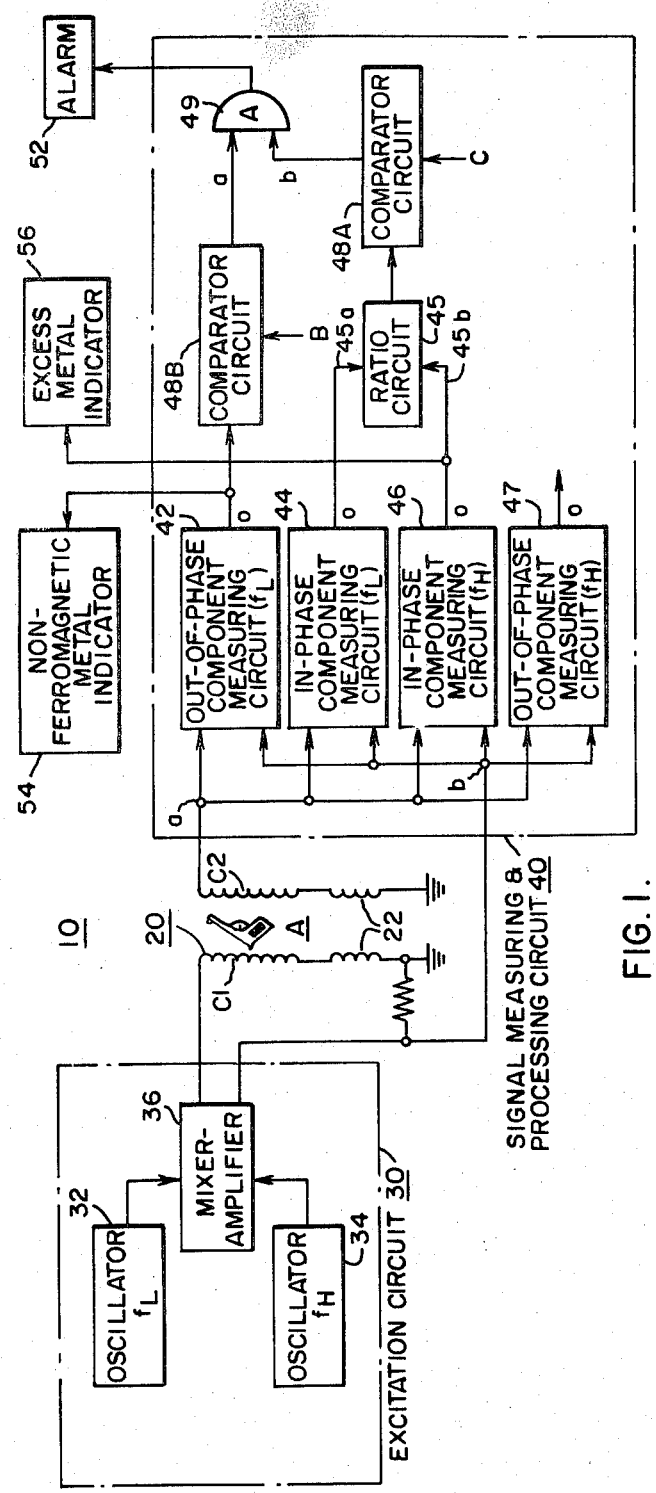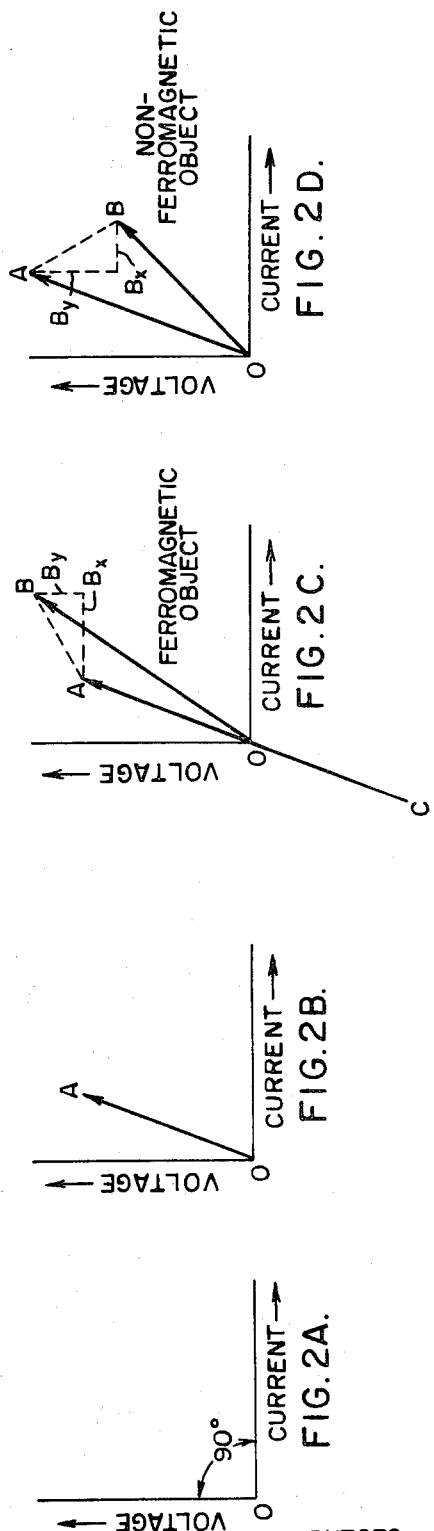

Patented Aug. 22, 1972 3,686,564

MULTIPLE FREQUENCY MAGNETIC FIELD TECHNIQUE FOR DIFFERENTIATING BETWEEN CLASSES OF METAL OBJECTS

BACKGROUND OF THE INVENTION

Numerous state-of-the-art metal detectors employing oscillating magnetic fields are available and have found use in applications such as mine detectors, prospecting devices, and the like. These state-of-the-art devices, which usually employ a measuring field oscillating at a single frequency, detect the presence of a metal object usually by measuring the power which the object absorbs from the field, or by detecting the change in coupling between two coils produced by the object. The state-of-the-art devices provide little information concerning the geometry of the object, and do not have the capability, without being transported from point to point, of distinguishing between small metal objects close by and larger metal objects further away.

The inability of current state-of-the-art metal detectors to clearly discriminate sufficiently between objects of varying size, shape and thickness renders them unsuitable for critical applications such as the detection of concealed weapons.

SUMMARY OF THE INVENTION

In this invention, oscillating magnetizing fields of various frequencies are generated through the use of one or more magnetizing devices, shaped to produce a desired field distribution in the region of space through which the metal objects pass.

The magnetizing fields are provided most simply by one or more magnetizing coils carrying A.C. current with a spectrum of frequencies. The geometry of the magnetizing coils is such as to produce a direction of magnetization having components of magnetizing field along the principal axes of interest in the metal object. For a concealed object carried through the field, such direction of magnetization may be achieved by a suitable distribution of this magnetizing field in space. For a concealed object fixed in space, a field along the principal axes, for various time intervals, is guaranteed by rotating the direction of the magnetizing field as a function of time.

The spectrum of frequencies in each magnetizing coil includes at least two frequencies, a "high" frequency, for which ideally the skin depth of the magnetic field of a specific class of metal objects of interest is small compared with the thickness, and a "low" frequency for which the calculated skin depth is large compared with the thickness.

A simple technique for investigating the induced field of a metal object involves the use of detector coils positioned at various points in space. As a special case, the magnetizing coils themselves may serve as detector coils.

The voltage in the detector coils produced by the magnetizing field itself is subtracted out by use of suitable electronics or electrical circuits, so that only the voltage produced by the induced field of the metal object is measured. Electronic circuits are provided for measuring at each frequency the in-phase and out-of-phase component of the induced voltage with respect to the magnetizing current of that frequency.

The electronic measuring circuitry allows not only these components of voltage to be measured, but also provides for taking ratios of the various components, and in general allows comparison of the components after various algebraic operations have been performed on them. The operation of taking ratios is particularly useful since it tends to eliminate dependence of the result on the magnitude of the applied magnetizing field.

Since the voltage measured in a detector coil depends upon the magnetic flux from the metal object linking the detector coil, each voltage component, at each frequency, depends upon the aforementioned material and geometric parameters characterizing the metal object.

This dependence may be examined theoretically or empirically. A class of objects which are ferromagnetic with the general geometry of a hand gun, for example, will produce a set of responses in the measuring circuits different from other classes of objects. By selecting from all the possible measurements, or combinations of measurements, those particular measurements which are most distinctive and which best categorize a class of objects, a pattern for that class of objects is established from these measurements.

Electronic circuitry is used to recognize that pattern and to operate an indicator signal such as a light or an alarm when it occurs.

DESCRIPTION OF THE DRAWING

The invention will become more readily apparent from the following exemplary description in connection with the accompanying drawing.

FIG. 1 is an electrical schematic illustration of an embodiment of the invention;

FIGS. 2A, 2B, 2C and 2D are vector diagrams illustrating the operation of the invention disclosed in FIG. 1;

DESCRIPTION OF THE PREFERRED EMBODIMENT

Figure 5A:
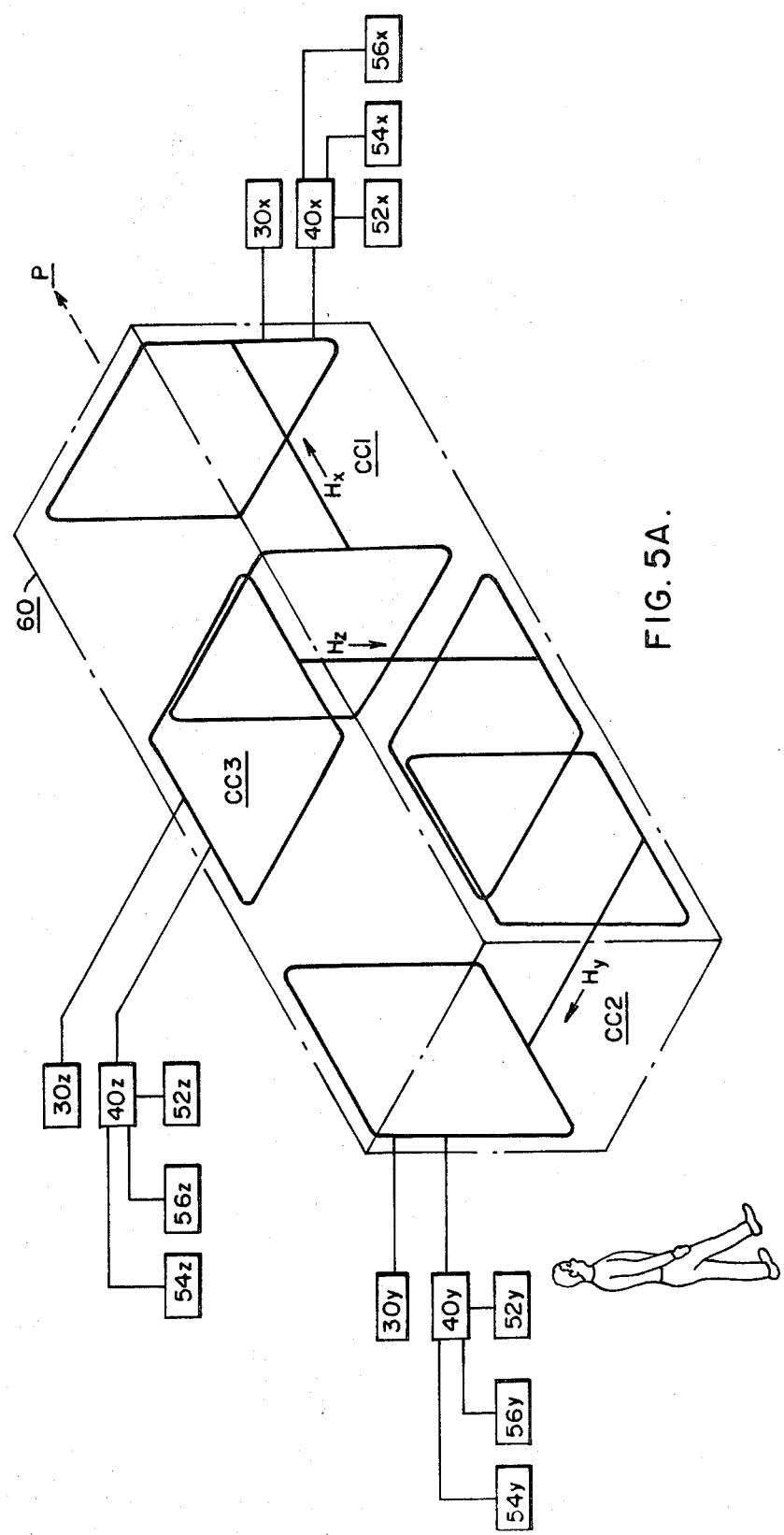
FIGS. 5A and 5B are illustrations of alternate embodiments of the invention as illustrated in FIG. 1.

Referring to FIG. 1 there is illustrated schematically a particular embodiment of the A.C. electromagnetic metal detector apparatus 10 comprising this invention. The A.C. electromagnetic metal detector of FIG. 1 is comprised of a coil configuration 20 including a magnetizing coil $C_1$ and a detector coil $C_2$, an excitation circuit 30 operatively connected to the magnetizing coil $C_1$ and a signal measuring and processing circuit 40 operatively connected to the detecting coil $C_2$. The operation of the A.C. electromagnetic metal detector apparatus 10 in accordance with the invention can be basically described as follows. A metal object is subjected to A.C. magnetic fields of at least two frequencies, one "high" and one "low", in response to the excitation of the magnetizing coil $C_1$ by the excitation circuit 30. The irradiation of the metal object by these magnetic fields results in the magnetization of the metal object. The detecting coil $C_2$ is disposed relative to the metal object to detect the magnetic field produced by the magnetized metal object and to generate a signal corresponding to this magnetic field. The ultimate in information to be derived from the magnetized object would necessitate the measurement of the magnetic field produced by the object from every point in space.

The signal measuring and processing circuit 40 derives the components of the signal generated by the detector coil $C_2$ which are in-phase with the current in the magnetizing coil $C_1$, and the components which are out-of-phase with the current in the magnetizing coil $C_1$ and processes these component measurements to classify the metal object on the basis of parameters such as size, shape, thickness and surface-to-volume ratio.

The measurement of the in phase component at each frequency is a measure of the energy loss at each frequency attributable to the metal object. The measurement of the out-of-phase component indicates whether the metal object is ferromagnetic or non-ferromagnetic. For a ferromagnetic object at low frequency, the out-of-phase component tends to be determined by the induced magnetism of the object, and for a non-ferromagnetic metal object the out-of-phase component tends to be determined by the field of the induced eddy currents in the object. For a non-ferromagnetic insulator, both the in-phase and out-of-phase components tend to be very small.

Briefly then, the invention relates to the examination of magnetic fields produced by metal objects which are subjected to A.C. magnetic fields of more than one frequency. While FIG. 1 illustrates the use of both a magnetizing coil $C_1$ and a detector coil $C_2$, the use of the magnetizing coil alone is sufficient to provide the magnetic field information required to classify the metal object. Furthermore, inasmuch as the essence of the invention concerns monitoring magnetic fields, other magnetic field responsive devices, such as a magnetometer, may be used in place of the coils.

In the specific embodiment of FIG. 1 coils $C_1$ and $C_2$ are arranged in a transformer-like configuration in which the magnetizing coil $C_1$ functions as the primary coil of the transformer by coupling energy to the detector coil $C_2$ which corresponds to the secondary coil of a transformer. Ideally in the operation of the transformer arrangement of the coil configuration 20 the magnetizing coil $C_1$ causes an induced voltage to appear in the detector coil $C_2$ which differs in phase with the current in the magnetizing coil $C_1$ by 90°. This vector relationship of an ideal transformer (not exhibiting losses) is illustrated in FIG. 2A wherein the vector OA corresponds to the induced voltage. The presence of a magnetically permeable core member or metal object will alter this ideal phase relationship resulting in rotation of the secondary voltage vector OA as illustrated in FIG. 2B. The change in vector relationship between the induced secondary voltage and the current in the detector coil configuration 20 is utilized due to the presence of a metal object by the A.C. electromagnetic metal detector apparatus 10 to classify magnetically permeable objects passed within the active detecting area A defined by coil $C_1$ on the basis of thickness, volume and ferromagnetic or non-ferromagnetic characteristics. The signal measuring and processing circuit 40 provides the classification capability by monitoring the characteristics of all magnetically permeable objects passed within the field generated by magnetizing coil $C_1$ and generating a signal to actuate the alarm circuit 52 in response to the presence of an object of a specific class, such as a gun. The apparatus 10 will be subjected to extraneous magnetic influences existing in the surrounding operational environment such as exist at airport facilities, and these extraneous magnetic influences will result in a displacement of the secondary induced voltage vector which is unrelated to the objects to be monitored. The vector OA of FIG. 2C represents the displaced secondary induced voltage resulting from the extraneous magnetic fields as well as the signal induced in the detector coil $C_2$ by the excitation signal applied to the magnetizing coil $C_1$. The vector OC, which is 180° out-of-phase with the vector OA, corresponds to the influence of a phase shifter circuit, such as a controlled mutual inductor 22, providing the null, or zero, operating conditions for the apparatus 10. Having accomplished the null operating conditions for the apparatus 10, the insertion of a magnetically permeable object in the active field area A developed by coil $C_1$ results in a further displacement and change in length of the vector corresponding to the induced secondary voltage which is represented by vector OB of FIG. 2C. The resultant change in the secondary induced voltage from vector OA to vector OB is illustrated by a line A–B, which resultant may be resolved into component $B_x$ which is in-phase with the current in the magnetizing coil $C_1$ and component $B_y$ which is out-of-phase with the current in the magnetizing coil $C_1$. The component $B_x$ is a measure of the electrical and magnetic energy loss (also referred to as eddy current loss or power absorbed by the object) produced by the magnetically permeable object and the component $B_y$ is an indication as to whether the object is ferromagnetic or non-ferromagnetic. The measurement of these two parameters by the signal measuring and processing circuit 40 at more than one magnetizing excitation frequency, as established by excitation circuit 30, provides the information necessary to discriminate between a predetermined class of objects, such as guns, and other magnetically permeable objects.

Due to the current interest in detecting concealed firearms the operation of the apparatus 10 will be concerned with discriminating between magnetically permeable objects corresponding to small guns, and other miscellaneous magnetically permeable objects which are likely to be present.

Figure 3:
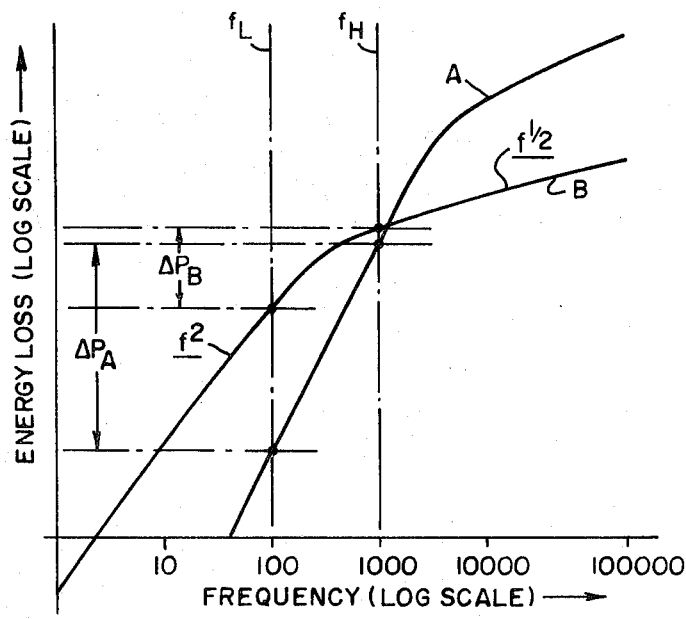
FIG. 3 is a graphical illustration of curves plotting energy loss v. frequency for two classes of metal objects.

A plot of energy loss (power absorbed) versus magnetizing coil $C_1$ excitation frequency for two classes of magnetically permeable objects is depicted in curves A and B of FIG. 3. Curve A corresponds to objects composed of relatively thin metal elements such as keys, aerosol cans, radios, cameras, etc., while curve B corresponds to small guns. It is apparent from the curves of FIG. 3 that from the measurements of energy loss at, or between, two selected frequencies, information can be derived whereby the ratios or slopes $\Delta P_A$ and $\Delta P_B$ of the curves A and B, respectively, can be utilized to determine the classification of the magnetically permeable objects.

The magnetizing coil $C_1$ excitation frequencies at which, or between which, the energy loss of the metal objects of the type corresponding to curves A and B of FIG. 3 is to be measured are selected to provide ratios of the measurements of the energy loss of the curves at the selected frequencies which will render the class of objects of interest clearly distinguishable from other objects likely to be monitored by the apparatus 10.

Assuming the detection of guns is of prime interest, the ratio $\Delta P_B$ of curve B defined between selected frequencies of approximately $f_L$ (100 hertz) and $f_H$ (1,000 hertz) is clearly distinguishable from the ratio $\Delta P_A$ of curve A.

The selection of frequencies $f_L$ and $f_H$ to provide accurate gun detection discrimination is based on the known condition that if an object is subjected to a sufficiently high frequency ($f_H$) to result in a skin depth in the object which is relatively small compared to the thickness ($t$) of the object, the power (P) absorbed by the object in "energy loss" varies as $f^{1/2}$, while irradiation of the object by energy at a lower frequency ($f_L$), which results in the skin depth of the object being relatively large compared to the thickness ($t$), the power absorbed by the object varies as $f^2$. Thus, by making measurements of the power absorbed by an object at or between two frequencies, $f_L$ and $f_H$, it can be determined either that the object is relatively thin in comparison to the skin depth if the following relationship is satisfied:

$$P_H/P_L = (f_H/f_L)^2 \quad (1)$$

where $P_H$ is the power absorbed at the frequency $f_H$, and $P_L$ is the power absorber at the frequency $f_L$; or that the object is relatively thick in comparison to the skin depth if the following relationship is satisfied:

$$P_H/P_L = (f_H/f_L)^{1/2} \quad (2)$$

It is recognized that a gun is comprised of many thicknesses, thus the class of objects corresponding to guns falls between the relationships (1) and (2).

In the embodiment of the invention illustrated in FIG. 1 the oscillators 32 and 34 of excitation circuit 30 generate the frequencies $f_L$ and $f_H$ which are combined simultaneously in the mixer-amplifier 36 and subsequently applied to the magnetizing coil $C_1$. The mutual inductor 22, as noted above, functions to offset the signal induced in the detector coil $C_2$ by the excitation of the magnetizing coil $C_1$, as well as offsetting the influence of extraneous magnetic fields, to render a net zero input signal to the signal measuring and processing circuit 40 in the absence of a metal object passing within the active detection area A. The function of the mutual inductor 22 may be implemented by other means, or may be ignored completely if the signal induced in the detector coil $C_2$ by the magnetizing coil $C_1$ can be tolerated.

Signal measuring and processing circuit 40 comprises a measuring circuit 42 for measuring the out-of-phase component of the signal induced in detector coil $C_2$ at frequency $f_L$, an energy loss measuring circuit 44 for measuring the energy loss (in-phase component) attributable to the object at frequency $f_L$, and an energy loss measuring circuit 46 for measuring the energy loss (in-phase component) attributable to the object at frequency $f_H$. For the purpose of discussion the circuit selected to implement the operation of measuring circuits 42, 44 and 46 of FIG. 1 is the phase lock amplifier of which the Princeton Applied Research (PAR) Model HR8 is an example. The measuring circuits 42, 44 and 46 will hereinafter be referred to as phase lock amplifiers 42, 44 and 46. Each phase lock amplifier includes a first and second input terminal $a$ and $b$ and an output terminal $o$. The signal developed by the detector coil $C_2$ in response to the presence of a metal object in the active area A of the coil configuration 20 is supplied to the inputs $a$ of the phase lock amplifiers 42, 44 and 46 respectively, while a reference signal R which is in phase with the current in magnetizing coil $C_1$ and contains signals ($f_L + f_H$) is supplied to the input $b$ of the phase lock amplifier circuits 42, 44 and 46. Each phase lock amplifier includes input filter circuits and a reference signal phase control adjustment. The input filter circuits internally associated with the phase lock amplifiers 42 and 44 are designed to pass primarily the $f_L$ component of the input signals, while the input filter circuits internally associated with the phase lock amplifier 46 are designed to pass primarily the $f_H$ component of the input signals.

Inasmuch as the component $B_y$, as illustrated in FIGS. 2C and 2D, of the resultant vector displacement A-B is 90° out-of-phase with the current and, therefore, as in a pure inductance, the phase lock amplifier 42 is adjusted to measure the component of $f_L$ which is 90° out-of-phase with the current in the magnetizing coil $C_1$. Inasmuch as the energy loss component $B_x$ is in-phase with the current in the magnetizing coil $C_1$, as in a resistor, phase lock amplifiers 44 and 46 are adjusted to measure the in-phase components of $f_L$ and $f_H$, respectively. The phase lock amplifiers 42, 44 and 46 generate DC output signals which are proportional to the average value of the detector coil input signals at the respective frequencies and respective phase relationships.

The DC output signal of the phase lock amplifier 42, is arbitrarily chosen to be positive if the metal object is ferromagnetic, as indicated in FIG. 2C, and negative if the metal object is non-ferromagnetic as indicated in FIG. 2D. The determination of polarity of the output signal of the phase lock amplifier 42 is apparent from the plot of out-of-phase voltage versus frequency in FIG. 4 for typical ferromagnetic metal objects, non-ferromagnetic objects and non-ferromagnetic insulators. This information coupled with the determination of the energy loss attributed to the metal object at the selected frequencies $f_L$ and $f_H$ provides three pieces of information which can be interpreted to define physical characteristics of the detected object, such as thickness, which can be utilized to classify the detected objects according to classes such as defined by curves A and B of FIG. 3. It is apparent that a fourth piece of information, i.e., the out-of-phase component at $f_H$, can be derived through the use of an additional measuring circuit 47 of the type described above in reference to measuring circuits 42, 44 and 46.

Furthermore it is apparent that in-phase and out-of-phase measurements at more than two frequencies can be implemented.

In the situation noted above where it is desired to discriminate between a gun and other metal objects, the information provided in the form of DC output signals can be processed through ratio circuit 45, comparator circuits 48A and 48B and logic AND gate 49 to produce an actuation signal for the alarm circuit 52 when an object having the characteristics of a gun is passed through the active sensing area A of the detector coil configuration 20.

Figure 4:
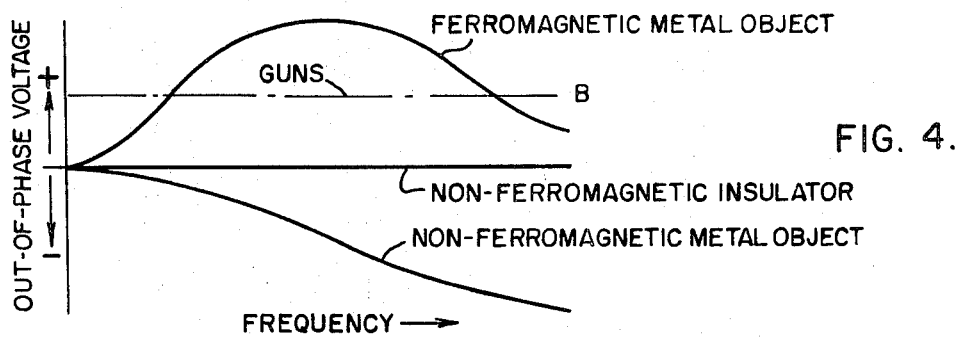
FIG. 4 is a graphical illustration of the out-of-phase component of induced voltage v. frequency of ferromagnetic and non-ferromagnetic objects subjected to magnetic fields by the embodiment of FIG. 1.

Since most guns contain iron, the pattern of measurement made by the signal measuring and processing circuit 40 corresponding to the class of objects comprising guns, includes:

1. a positive voltage output signal from phase lock amplifier 42, above a selected threshold B set by comparator circuit 48B and defined in FIG. 4 corresponding to the smallest hand gun to be detected. (This eliminates non-ferromagnetic and small ferromagnetic objects.)

2. a ratio measurement of low frequency energy loss to high frequency energy loss from ratio circuit 45 above a selected threshold C as determined by comparator circuit 48A. (This requirement tends to differentiate between hand guns and other ferromagnetic metallic objects.)

It follows therefore that the first measured characteristic of a gun is fulfilled if a positive DC output signal above the threshold B is developed by the phase lock amplifier 42 resulting in the application of a positive signal to the input 49a of the logic AND gate 49 by comparator circuit 48B. The second measured characteristic required to develop a positive signal at the input 49b of logic AND gate 49 is determined by the output of comparator circuit 48A. The D.C. output signal of phase lock amplifier 44, corresponding to the energy loss at $f_L$ is supplied to input 45a of the ratio circuit 45, and the D.C. output signal of the phase lock amplifier 46, corresponding to the energy loss and $f_H$, is supplied to the input 45b of the ratio circuit 45. The ratio circuit 45 produces an output signal which is proportional to the ratio of the output signals of phase lock amplifiers 44 and 46. It has been determined that the ratio of high frequency energy loss to low frequency energy loss for guns, where $f_H$ is approximately 1000 Hz and $f_L$ is approximately 100 Hz, is in the range of about 10 to 1. The output signal of the ratio circuit 45 is supplied as a first input signal to comparator circuit 48A and a threshold signal C is supplied as a second input signal to comparator circuit 48A. The value of the threshold signal C corresponds to the metal object classification defined by curve B of FIG. 3 between frequencies $f_L$ and $f_H$. If the output signal from the ratio circuit 45 is equal to or less than the threshold signal C, the comparator circuit 48A generates a positive output signal indicating a detected metal object of the class defined by curve B. If this positive signal coincides with a positive signal at the input terminal 49a, the combination indicating a ferromagnetic object of a class comparable to a gun, the logic AND gate 49 will transmit an actuating signal to an alarm circuit 52. The processing of the in-phase and out-of-phase components thus described to provide alarm actuation is based primarily on object thickness.

While the signal processing thus provided accounts for the majority of situations in which a gun is passed through the active detecting area, there exists two situations in which a gun would not result in an alarm actuating output signal from the logic AND gate 49. The first of these situations occurs if the gun is constructed of a non-ferromagnetic material, i.e., aluminum, in which case the D.C. output signal of the phase lock amplifier 42 would be negative, and the second situation where the gun is accompanied by additional metallic objects producing energy loss measurements by the phase lock amplifiers 44 and 46 which results in an output from ratio circuit 45 indicative of a metal object outside the classification for guns.

Either situation cannot be tolerated if optimum gun detection is to be accomplished. Therefore the negative output from the phase lock amplifier 42 is connected to a non-ferromagnetic object detector 54, and an excess metal detector 56 is connected to the output of the phase lock amplifier 46. The information provided by indicators 54 and 56 alerts an operator to the possibility of the passage of a gun to the active detecting area thereby enabling the operator to take appropriate action. A typical relay voltmeter as marketed by Assembly Products Incorporated can be used to measure the magnitude of the signal developed by the phase lock amplifier 46 and provide an alarm actuation when the magnitude reaches a predetermined value indicative of excess metal. It is noted that the output signal from phase lock amplifier 44 could also be used to indicate excess metal inasmuch as all metal exhibits loss when subjected to magnetic fields. The amount of loss exhibited is in direct relationship to the amount of metal present.

While the embodiment of the invention depicted in FIG. 1, utilizing a single coil configuration 20, illustrates the basic principle of operation of the invention, practical implementation of the invention to provide optimum object detection and discrimination necessitates the use of coil configurations which provide either rotating field sensitivity or $x$, $y$ and $z$ axis sensitivity to the metal objects in order to minimize the affect of the axis alignment of the metal object as it passes through the active detecting area A. This requirement is particularly critical in detecting guns inasmuch as it is impossible to control the orientation of a gun as it passes through the active detecting area. Numerous combinations of coil configurations and associated electronics may be employed to generate the three mutually orthogonal magnetic fields $H_x$, $H_y$ and $H_z$ required to monitor the metal object and process the results and information obtained.

Figure 5B:
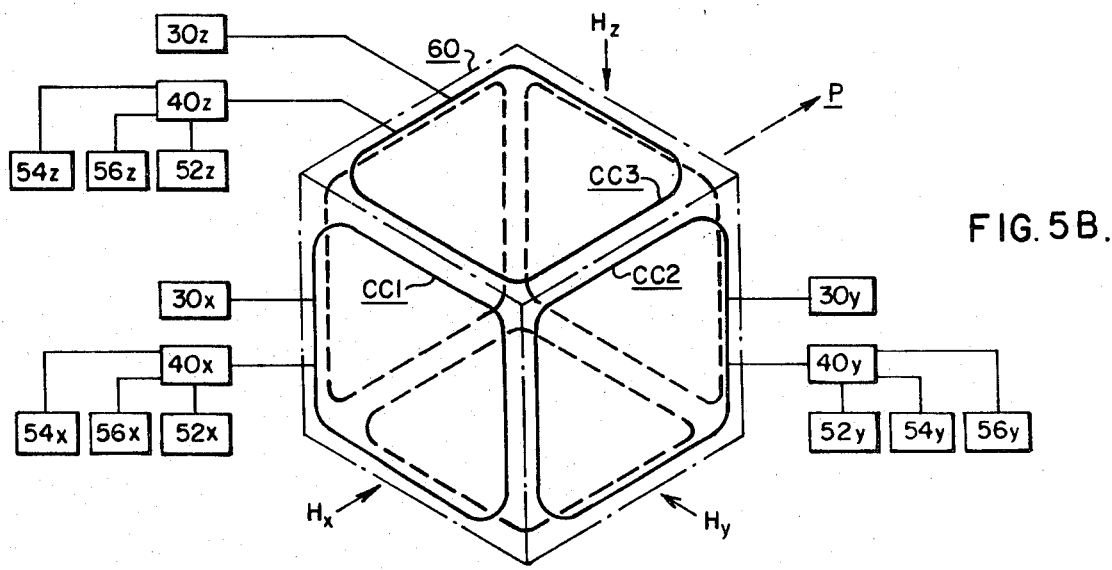

Referring to FIGS. 5A and 5B there is illustrated typical implementation of coil configurations and circuitry for generating magnetic fields to completely enclose the path of travel of a metal object in order to monitor the characteristics of the object in the manner disclosed above with respect to the operation of the embodiment of FIG. 1. The multi-axis monitoring of the metal object provides optimum detection and discrimination regardless of orientation of the metal object. The embodiment illustrated in FIGS. 5A and 5B comprise a walk-through structure 60 having a passageway P. The walk-through structure 60 can be positioned in the path of travel of air line passengers in airport boarding areas.

In the walk-through structure 60 of FIG. 5A three distinct coil configurations $CC_1$, $CC_2$ and $CC_3$ of comparable size are positioned in a successive manner along the walk-through structure. The positioning of the coil configurations $CC_1$, $Cc_2$ and $CC_3$ results in a generation of three mutually orthogonal magnetic fields corresponding to the $x$, $y$ and $z$ axes respectively in response to excitation circuits $30x$, $30y$ and $30z$. The coil configurations $CC_1$, $CC_2$ and $CC_3$ correspond substantially to the coil configuration 20 disclosed schematically in FIG. 1. One method of constructing the coil configuration involves the use of bifilar wire wherein one of the conductors corresponds to the magnetizing coil $C_1$ of FIG. 1 and a second conductor corresponds to the detector coil $C_2$ of FIG. 1. The embodiment illustrated in FIG. 5A depicts each of the coil configurations as comprising two segments A and B positioned in a parallel relationship on opposite surfaces of the walk-through structure 60. While the respective $x$, $y$ and $z$ magnetic fields could be generated by using but one of the segments of each of the coil configurations $CC_1$, $CC_2$ and $CC_3$ the utilization of the two segments provides for a more uniform magnetic field in each of three axes. While individual excitation circuits $30x$, $30y$ and $30z$, and signal measuring and processing circuits $40x$, $40y$ and $40z$ are connected to the individual coil configurations to provide separate measurements of the metal object characteristics in each of the three axes, a single excitation circuit and a single signal measuring and processing circuit could be employed if the coil configurations are connected in series. The circuitry employed in each of the circuits $30x$, $30y$ and $30z$, and $40x$, $40y$ and $40z$ corresponds substantially to the circuitry utilized in the circuits 30 and 40 of FIG. 1. In the embodiment illustrated in FIG. 5A if an individual carrying a concealed weapon passes through the walk-through structure 60 one or more of the respective signal and processing circuits will generate an alarm actuating output signal depending on the orientation of the concealed weapon. Therefore the duplication of the A.C. electromagnetic metal detecting apparatus 10 of FIG. 1 for the $x$, $y$ and $z$ axes provides the operating capability of discriminating between a gun and other metal objects regardless of the orientation of the gun. The position of the coil configuration $CC_1$, $CC_2$ and $CC_3$ successively along the walk-through structure 60 provides the isolation of each of the coil configurations which is required if the frequencies $f_L$ and $f_H$ in each coil configuration are the same.

The embodiment illustrated in FIG. 5B depicts the coil configurations $CC_1$, $CC_2$ and $CC_3$ as generating magnetic fields in the same passageway volume of the walk-through structure 60. In order to utilize this foreshortened walk-through structure while providing discrete measurements of the characteristics of the metal object at the $x$, $y$ and $z$ axes it is necessary to utilize three sufficiently distinct sets of excitation frequencies for the respective coil configurations to avoid interaction between the measurements made. Once again the excitation circuitry and the signal processing and measuring circuitry for the coil configurations of the embodiment illustrated in FIG. 5B correspond substantially to the circuitry utilized in the basic embodiment illustrated in FIG. 1.

We claim:

1. Apparatus for detecting preselected classes of metal objects, comprising,
    an A.C. electromagnetic means including magnetizing means,
    a multi-frequency excitation circuit means operatively connected to said magnetizing means, said magnetizing means responding to excitation current signals from said multi-frequency excitation circuit means by developing at least first and second oscillating magnetic fields, said first oscillating magnetic field being a low frequency oscillating magnetic field and said second oscillating magnetic field being a high frequency oscillating magnetic field, said metal objects being subjected to said oscillating magnetic fields,
    detecting means for monitoring the induced magnetic fields developed by said metal objects being subjected to said low and high frequency oscillating magnetic fields and developing output signals representative thereof, said signals including components at each frequency which are in-phase and out-of-phase with said excitation current signals, and
    signal measuring and processing circuit means operatively connected to said detecting means, said signal measuring and processing means including first circuit means responding to said in-phase components at each frequency by generating first output signals indicative of energy loss attributable to said metal objects at each frequency second circuit means responding to said out-of-phase components by generating second output signals indicative of whether said metal objects are ferromagnetic or nonferromagnetic, and third circuit means responsive to said first and second output signals for evaluating said signals and generating a third output signal indicative of the class of said metal objects.

2. Apparatus as claimed in claim 1 wherein said low frequency oscillating magnetic field being selected from a range of frequencies for which the skin depth of said induced magnetic field developed by said preselected class of metal objects is relatively large compared with the thickness, said high frequency oscillating magnetic field being selected from a range of frequencies for which the skin depth of said induced magnetic field developed by said preselected class of metal objects is relatively small compared to the thickness.

3. Apparatus as claimed in claim 2 wherein said magnetizing means includes a coil configuration having at least one magnetizing coil, and said detector means includes at least one detector coil for developing said output signals of said detector means as a function of the magnetic flux linking said metal objects and said detector coil at each of the frequencies of said low frequency magnetic field and said high frequency magnetic field.

4. Apparatus as claimed in claim 1 further including circuit means for substantially eliminating from the signals developed by said detector means the effect of the excitation signals of said multi-frequency excitation circuit means.

5. Apparatus as claimed in claim 2 wherein said magnetizing means includes three coil configurations operatively connected to said multi-frequency excitation circuit means to generate three substantially mutually orthogonal magnetic fields each comprised of a low and a high frequency oscillating magnetic field, said signal measuring and processing circuit means being operatively connected to said three coil configurations to provide detection and discrimination of metal objects passing through said magnetic fields regardless of orientation of said metal objects.

6. Apparatus as claimed in claim 5 wherein said three coil configurations are positioned about the path of travel of said metal objects and are disposed in a successive manner such that said metal objects are sequentially subjected to the magnetic fields of the respective coil configurations.

7. Apparatus as claimed in claim 5 wherein said three coil configurations are positioned about the path of travel of said metal objects such that the metal objects are simultaneously subjected to the magnetic fields of the respective coil configurations.

8. Apparatus as claimed in claim 6 wherein the low and high frequency magnetic fields of each coil configuration are the same.

9. Apparatus as claimed in claim 7 wherein the low and high frequency magnetic fields of each coil configuration are different.

10. Apparatus as claimed in claim 1 wherein said out-of-phase components are approximately 90° out-of-phase with said excitation signals.

11. Apparatus as claimed in claim 1 wherein said oscillating magnetic fields are developed simultaneously.

12. Apparatus as claimed in claim 1 wherein said first circuit means determines the relative magnitudes of the signal components corresponding to energy loss at said low and high frequency, said first output signals representing the relationship of these magnitudes, said third circuit means responding to said first and second output signals for comparing said signals to predetermined values, said third output signal being generated if said first and second output signals establish a predetermined relationship with said predetermined values.

13. Apparatus for detecting preselected classes of metal objects, comprising,
an A.C. electromagnetic means including
magnetizing means,
a multi-frequency excitation circuit means operatively connected to said magnetizing means, said magnetizing means responding to excitation current signals from said multi-frequency excitation circuit means by developing oscillating magnetic fields, said metal objects being subjected to said oscillating magnetic fields, said oscillating magnetic fields including at least one low frequency magnetic field and at least one high frequency magnetic field,
detecting means for monitoring the induced magnetic field developed by said metal objects being subjected to said oscillating magnetic fields and developing output signals corresponding to said low and high frequency magnetic fields, and
signal measuring and processing circuit means including first circuit means responding to said output signals of said detecting means produced by said low frequency oscillating magnetic field by developing a first output signal which is out-of-phase with said excitation current signals, second and third circuit means for developing second and third output signals indicative of components of said output signals of said detecting means which are produced by said low frequency and said high frequency oscillating magnetic fields respectively, said second and third output signals being in phase with said excitation current signals, said first output signal being an indication of whether said metal objects are ferromagnetic or nonferromagnetic, said second and third output signals being a measurement of the energy loss attributable to said metal objects at said low frequency and high frequency oscillating magnetic fields respectively, fourth circuit means responsive to said second and third output signals for determining the relative magnitudes of said second and third output signals and developing a fourth output signal indicative of this relationship, and object classification circuit means responsive to said first output signal and said fourth output signal for generating an object classification output signal indicative of a specific class of metal objects.

14. Apparatus as claimed in claim 13 wherein said specified class of metal objects is small arms, such as pistols, the frequency of said low frequency magnetic field being approximately 100 hertz, and the frequency of said high frequency magnetic field being approximately 1,000 hertz.

15. Apparatus as claimed in claim 13 wherein said fourth output signal is indicative of a ratio between the energy loss at the high frequency oscillating magnetic field and the energy loss at the low frequency oscillating magnetic field.

16. Apparatus as claimed in claim 13 wherein said second and third circuit means include a second and third phase lock amplifier circuit respectively, each having a first and second input and an output, said output signals from said detector means being supplied to said first inputs and a reference signal comprised of the low frequency and high frequency signals developed by said multi-frequency excitation circuit being supplied to said second inputs, said second phase lock amplifier circuit developing said second output signal, said third phase lock amplifier circuit developing said third output signal, said second and third output signals corresponding to the energy loss attributable to said metal objects at said low and high frequencies respectively.

17. Apparatus as claimed in claim 13 wherein said first circuit means further includes a first phase lock amplifier circuit having a first and second input and an output, said output signals from said detector means being supplied to said first input and said reference signal being supplied to said second input, said first phase lock amplifier circuit developing said first output signal.

18. Apparatus as claimed in claim 15 wherein said ratio for a class of metal objects corresponding to small arms is approximately 10:1.

* * * * *